Figure 1:
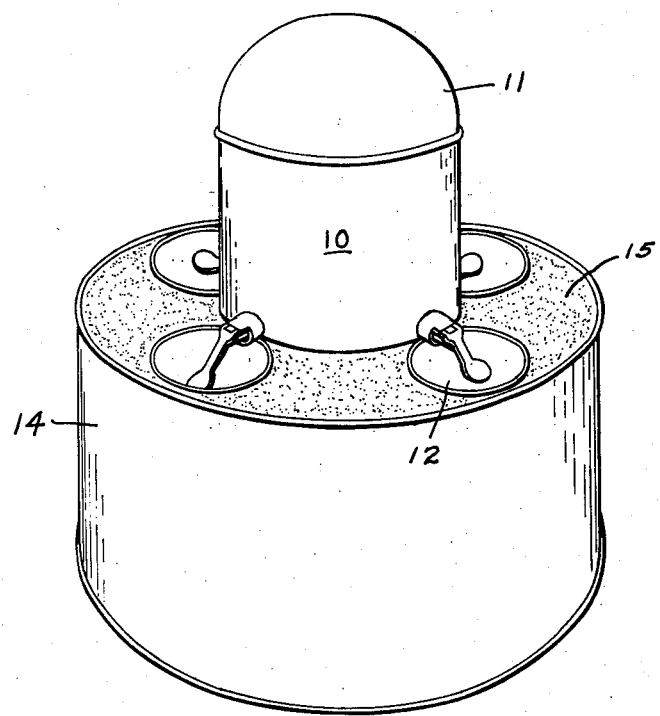

June 20, 1950  L. L. WARTES  2,512,510
LIVESTOCK WATERING APPARATUS
Filed March 18, 1946  2 Sheets-Sheet 1

Lloyd L. Wartes
INVENTOR

BY
ATTORNEY

June 20, 1950  L. L. WARTES  2,512,510
LIVESTOCK WATERING APPARATUS
Filed March 18, 1946                                     2 Sheets-Sheet 2

Lloyd L. Wartes
INVENTOR

BY *E. A. Burkham*
ATTORNEY

Patented June 20, 1950

2,512,510

UNITED STATES PATENT OFFICE 2,512,510

LIVESTOCK WATERING APPARATUS

Lloyd L. Wartes, Spokane, Wash.

Application March 18, 1946, Serial No. 655,089

7 Claims. (Cl. 119—73)

The present invention relates to livestock watering apparatus and more particularly to apparatus for furnishing dairy animals with warm drinking water.

It is generally agreed by stock and dairy men that if the livestock are permitted to browse around in the feed yard during cold weather instead of being confined in a barn, the animals are kept in better physical condition and are more productive. It is also generally agreed that the drinking water furnished the animals during cold weather should be well above freezing temperatures. However the furnishing of drinking water to livestock during cold weather has always been a problem due to the fact that at sub-freezing temperatures water contained in an open trough or in watering devices heretofore provided becomes completely unavailable to the livestock. When the water does not freeze, it is no warmer than the temperature of the atmosphere so that during the colder months, the cattle are forced to drink water which is too cold for their general well being.

A primary object of the present invention is to provide means for furnishing warm drinking water to livestock.

Another object of the invention is to provide a water dispensing apparatus, the operation of which is unaffected by freezing temperatures.

A still further object of the invention is to provide a watering apparatus comprising a drinking bowl and valve assembly so constructed that the same means employed for opening the valve closes the water outlet of the bowl.

Another object of the invention is to provide a watering apparatus so constructed that any excess water remaining in the bowl after the animal has finished drinking will automatically drain therefrom.

A further object of the invention is to provide, in a livestock watering apparatus, a valve of simple construction which can be serviced from the exposed front or outlet end thereof.

Another object of the invention is to provide a livestock watering apparatus of simple and strong construction, so arranged that the only water exposed to atmospheric temperatures is that present in the water dispensing bowl during the time the animal is drinking.

In accordance with the illustrated embodiment, the livestock watering apparatus of the present invention comprises a housing enclosing an insulated water tank, the tank being connected to a suitable source of fresh drinking water and being provided with heating means for maintaining the water at a desired elevated temperature. Outside of the housing there is provided one or more drinking bowls to which water is supplied by means of valves extending through the sides of the housing, the valves being provided with operating means so arranged within the bowls that moderate pressure thereon by the livestock will admit water to the bowl as needed. The bowls are provided with normally open drainage outlets which are controlled by the valve operating means so as to be closed as the valve is moved to an open position. An additional feature comprises a skirt extending around the housing outside of the bowls, the space between the skirt and the housing being filled with sand, gravel or other loose material which serves to add weight to the apparatus to prevent it from being upset by the animals and to provide additional heat insulation for the various parts thereof.

Figure 2:
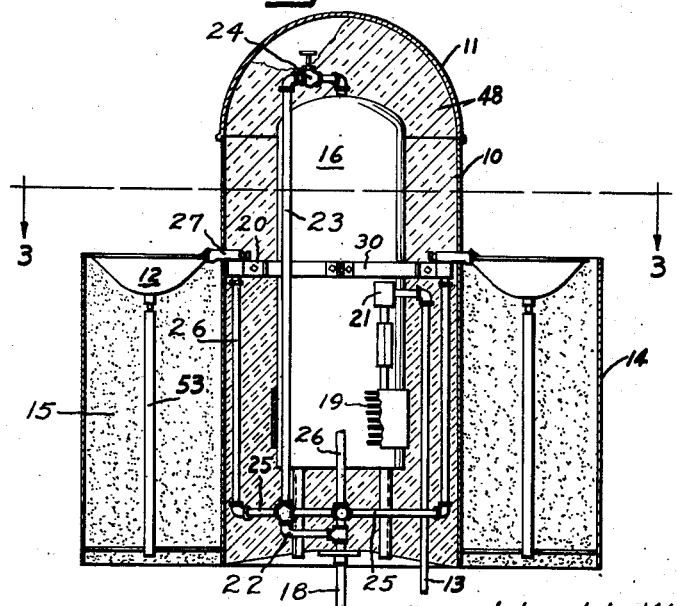
Figure 3:
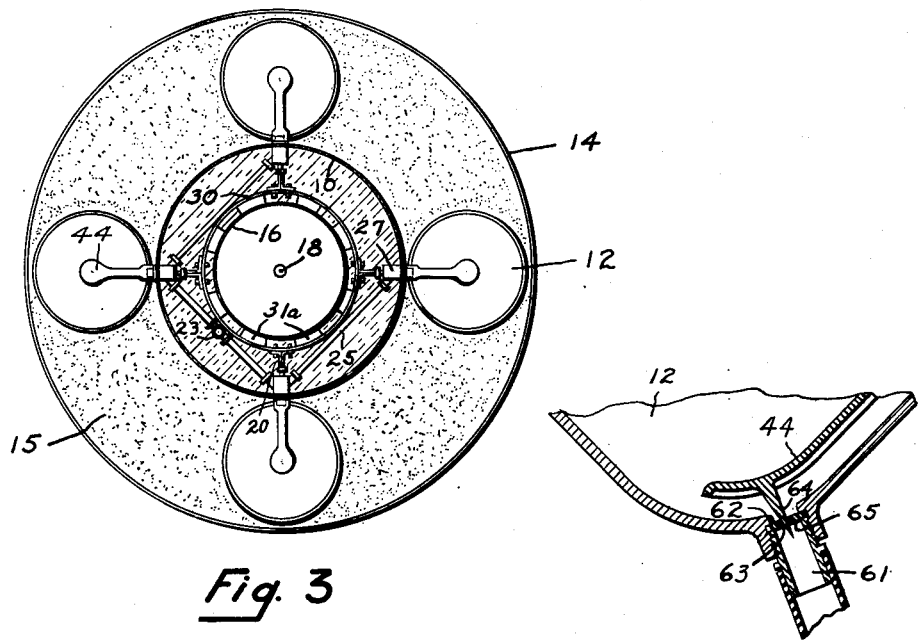
Figure 5:
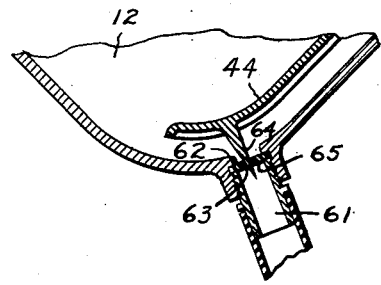
Figure 4:
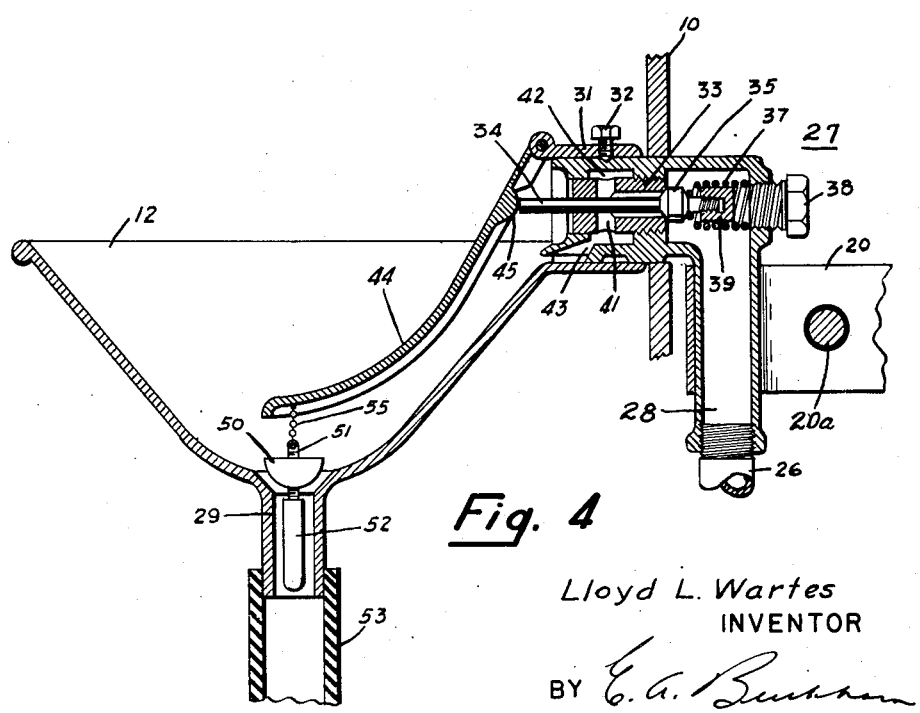

In the drawings Fig. 1 is a perspective view of the watering apparatus of the present invention; Fig. 2 is an elevational view of the apparatus with certain parts in section; Fig. 3 is a sectional view taken along the lines 3—3 of Fig. 2; Fig. 4 is an elevational view with certain parts shown in section of the valve and bowl assembly; and Fig. 5 is a cross-sectional view of a modification of the bowl outlet and closure means.

Referring to the drawing, numeral 10 indicates a cylindrical housing or enclosure having a removable top 11. A plurality of drinking bowls 12 are arranged at spaced intervals about the housing. A cylindrical member or skirt 14 extends around the housing and is spaced therefrom a sufficient distance so that bowls 12 are between housing 10 and skirt 14. The height of the skirt is such that the top thereof is approximately level with the rims of the drinking bowls so that when the space between skirt and housing is filled with some heavy material such as sand, gravel or the like indicated by numeral 15, the filling material will serve as additional support for the bowls. The skirt also protects the bowls against injury by livestock bumping thereagainst while the weight of the sand or gravel filling securely anchors the apparatus to the ground to prevent it from being upset, or loosened from the connections.

Within the housing 10 there is provided a water tank 16 connected by means of a pipe with a water inlet 18 extending through the bottom of the housing. The water in the tank is heated by means of an electrical resistance element 19 wrapped around the lower portion of the tank in thermal conductive relationship therewith.

The resistance element, which may comprise an ordinary soil-heating cable, is connected with a source of the electrical current by conductors extending through conduit 13 entering through the bottom of the housing, a temperature control switch 21 being provided in the circuit and in heat-exchange relationship with the tank in order to control the water temperature.

The water supplied to the bowls 12 during cold weather will ordinarily comprise a mixture of the heated water from tank 16 and cold water from the water supply in such proportions that the mixture will have a temperature of from about 50 to 65° F. A simple arrangement for obtaining such a mixture comprises a cold water supply pipe 22 connected directly to the water supply inlet 18 and a hot water supply pipe 23 extending from the upper part of the hot water tank, both pipes 22 and 23 being connected to the bowl supply distributor pipe 25. A valve 24 provided in pipe connection 23 adjacent to the top of the tank provides means for regulating the quantity of hot water passing therethrough and hence the proportion of hot water mixed with the cold water in pipe 22.

In the modification illustrated, four bowls have been provided around the housing, the warm water being supplied to these bowls by means of pipes 26 connected to the pipe 25. The pipes 26 terminate in valves 27, each of which serve to admit water to one of the bowls.

Referring particularly to Fig. 4, the valves 27 are generally L-shaped. Each valve is mounted with its inlet end 28 in a vertical position inside the housing 10 and secured to the water tank by means of brackets 20 which in turn are bolted to a band or hoop 30 extending around the water tank and spaced therefrom by a plurality of pads 31a. Only the horizontal outlet ends of the valves extend through the housing so that when the valves are closed no part of the water-containing system is exposed to atmospheric temperatures. The brackets 20 may be clamped around the valve inlet portions 28 by means of bolts 20a.

The bowls or cups 12 are generally of a shallow construction and have a normally open drainage outlet 29 at the bottom thereof. Integral with the rim of each bowl is a horizontally extending collar 31 adapted to slip over the protruding outlet end of valve 27 and to be held thereon by means of set screws 32 in such a manner that each bowl is fixedly and operatively attached to the valve and indirectly supported by brackets 20.

Each of the valves comprise a removable seat portion 33 threadably mounted in the throat of the valve and removable through the front of the valve by means of a spanner wrench insertable in the slotted forward or outlet end thereof. A stem 34 extends axially through the valve seat 33 and carries adjacent its inner end a valve disc 35 adapted to seat against the cooperatively bevelled edge of the valve seat. The disc is normally maintained in seated position by means of a spring 37. One end of the spring bears against plug 38 threadably mounted in the back of the valve opposite the valve outlet, which plug serves primarily as means for adjusting the spring pressure on disc 35. The spring is secured on the stem by means of a cylindrical member 39 threaded on the end of the stem so that the spring is held on the valve stem and can be removed through the front end of the valve along with seat unit 33 and stem 34. Member 39 acts also as a guide to prevent sideways displacement of the spring during movement of stem 34.

The valve seat unit 33 is so constructed that when disc 35 is moved against the action of spring 37, water will pass through an axial opening around stem 34 and transverse opening 41 which in turn communicates with a recess 42 extending circumferentially around the inner side of the valve body and having an outlet 43 adjacent the bottom of the recess for discharging water into the bowl.

The valve operating means comprises a lever arm 44 pivotally or hingedly mounted on the upper front portion of collar 31 in front of valve 27 and extending downwardly from its pivot point along the inside of bowl 12. The lever is curved at least adjacent its lower end to conform substantially to the curvature of the bowl, the lower end of the lever being flared or flattened and overlying the bowl outlet 29. A rounded portion 45 on the back of the lever arm rests against the end of stem 34 and the lever arm is normally held thereby in spaced relationship with the inner surface of the bowl.

With the valve arrangement shown downward pressure by livestock on lever 44 serves to open the valve by movement of disc 35 away from the valve seat against the action of spring 37 to cause a supply of water to be discharged into the bowl. As pressure is removed from lever 44, valve 27 is again closed by the combined action of spring 37 and the pressure of the water on the back of disc 35. The lever is so mounted on the collar that it can be swung upwardly about its pivotal connection thus providing access to the valve for removal of the valve seat and stem control assembly through the front end of the valve in the event of replacement or repair.

Means operatively connected to the valve operating means are provided for closing the bowl outlet when lever arm 44 is pressed downwardly to the valve opening position. In the modification shown in Fig. 4, the outlet closing means comprises a hemispherical plug or stopper 50 of rubber or other suitable material, the rounded end of which is adapted to seat against the bevelled edge of outlet 29. This plug is mounted on a threaded rod 51 extending into the bowl outlet. The upper end of the rod is secured to the lower end of lever 44 by means of a chain 55; the length of the chain and the position of the plug on rod 51 being so adjusted that as the lever arm is depressed to a valve-opening position, the plug, which is otherwise suspended above the bottom of the bowl, drops into and closes the outlet. To increase the mass of the suspended plug assembly a suitable weight 52 is secured to the lower end of the rod. As pressure on the lever is removed, the plug is lifted to open the outlet permitting the excess water to drain from the bowl through discharge tube 53.

A modified bowl outlet and outlet closure means is shown in Fig. 5. In this modification, the drain outlet is offset somewhat from the center of the bowl and is internally threaded for receiving a connection 61. A resilient, flexible washer or diaphragm 65 held in place against shoulder 62 by the connection 61 is provided with a small hole 63 through which residual water may drain from the bowl. To prevent drainage of water during usage a closure means is secured to the bottom of lever arm 44 in the form of a generally cone-shaped member 64 in cooperative position with the regard to the aperture 63. The elongated tip of the member 64 extends slightly into the aperture 63 to insure alignment therewith, there being sufficient clearance between the vertex of member 64 and the sides of apertures 63 to permit drainage of water from the bowl when the lever 44 is in the raised position. When the lever is pushed downwardly to a valve opening position, closure of the outlet is effected by contact of the tapered sides of member 64 with the walls of washer 65 defining aperture 63.

In both of the bowl drainage arrangements as disclosed, fouling of the drainage outlet by straw, feed and the like dropped into the bowl by the animal, is prevented.

As considerable latitude is permitted as to the temperature of the water supplied to the bowl during winter months, only seasonal adjustments of the valve 24 is necessary in order to provide drinking water within the desired range. Ordinarily valve 24 will be closed during warmer weather, all of the drinking water being supplied directly to the bowls from supply line 8 through pipe 22. During such times heating means 19 can be disconnected from the source of electric energy.

From the above description, it will be apparent that the present invention provides a watering apparatus which cannot be easily damaged by the livestock. The space between tank 16 and housing 10 is intended to be filled with a heat insulating material 48 such as mineral wool, asbestos or the like whereby the water and all parts of the apparatus which would be adversely affected by freezing temperatures are protected from freezing and also due to the fact that heating element 19 will maintain all of the parts within the housing at non-freezing temperatures. Since water is present in the exposed parts, that is, in the outlet end of valve 27, the bowl and bowl drainage system only during the time that water is being consumed by the animal and since the remaining water is automatically drained from the bowl after the animal has finished drinking, there is no danger that the water will freeze in these parts during such short periods of exposure to the atmosphere.

Having described the invention in what are considered to be preferred embodiments thereof it is desired that it be understood that the specific details shown are merely illustrative and that the invention may be carried out in other ways without departing from the spirit and scope of the following claims.

What I claim is:

1. A livestock watering apparatus comprising a tank, a source of water supply, means connecting said source with said tank, an electrical resistance heating element wrapped around said tank, an enclosure for the tank having a removable cover, heat insulation within said enclosure and surrounding said tank, a drinking bowl, said bowl arranged on the outside of said enclosure, a skirt surrounding said enclosure in spaced relationship below the bowl and adapted to be filled with a material having sufficient weight to anchor said apparatus, a valve for controlling the flow of water into said bowl, the outlet end of said valve extending outside of said enclosure, a pipe connecting said source to the valve inlet, a conduit connecting the top of the tank with said pipe, means in said conduit for controlling the quantity of heated water passing therethrough, means for removably supporting the bowl on the outlet end of said valve, bracket means secured to the tank for supporting said valve and said bowl, a valve operating means comprising a lever hingedly mounted on the bowl, said lever extending downwardly along the inside of said bowl and terminating at its lower end above the bottom of said bowl, a control stem extending through said valve and adapted to be engaged by said lever, a valve disc mounted on said stem, a valve seat intermediate said valve operating means and said disc, said seat being removable from the outlet end of said valve on movement of the valve operating means to an inoperative position, a water outlet adjacent the bottom of the bowl, a closure element for said outlet, said closure element being connected with said lever and adapted to close said outlet on depression of said lever, the depression of said lever simultaneously effecting the opening of said valve.

2. A livestock watering apparatus comprising a tank, a source of water supply, means for heating the water in the tank, an enclosure for the tank having a removable cover, heat insulation within said enclosure and surrounding said tank, a drinking bowl on the outside of said enclosure and having a drainage outlet in the bottom thereof, a protective skirt surrounding said enclosure in spaced relationship below the bowl, a valve for controlling the flow of water into said bowl, said valve extending through the wall of the enclosure with its outlet end outside of said enclosure, a conduit connecting said valve with the said source, a pipe connecting the tank with said conduit for introducing heated water into said conduit, means in the pipe for controlling the quantity of heated water passing therethrough, means for removably supporting the bowl on the outlet end of said valve, bracket means secured to said tank for supporting said valve and said bowl, valve operating means comprising a lever arm hingedly mounted on the bowl, said lever arm extending downwardly along the inside of said bowl and overlying the bowl outlet, a control stem extending through said valve and adapted to be engaged by said lever, a disc mounted on said stem, a valve seat intermediate said valve operating means and said disc, said seat being removable from said valve on movement of the valve operating means to an inoperative position, closure means for the bowl outlet, said closure means comprising a closure element for said outlet and flexible means for securing said element to the lever arm whereby the element is seated in the bowl outlet on depression of said lever arm to a valve operating position.

3. A livestock watering apparatus comprising a tank, a source of water, means connecting said source with said tank, an electrical heating element wrapped around the tank, an enclosure for the tank having a removable cover, heat insulation within said enclosure and surrounding said tank, a shallow drinking bowl, said bowl being arranged on the outside of said enclosure, a skirt surrounding said enclosure in spaced relationship below the bowl and adapted to be filled with a material having sufficient weight to anchor said apparatus, a valve for controlling the flow of water into said bowl, said valve extending through said enclosure with its outlet end outside of said enclosure, a conduit connecting said valve with said source, a pipe connecting the tank with said conduit and adapted to introduce heated water into said conduit, means in said pipe for controlling the quantity of heated water passing therethrough, means for supporting the bowl on the outlet end of said valve comprising a collar integral with one side of said bowl and adapted to be mounted on the outlet end of said valve, bracket means secured to said tank for supporting said bowl and said valve, valve operating means comprising a lever hingedly mounted on said collar and extending downwardly along the inside of said bowl with its lower end above the bottom of said bowl, a control stem extending through said valve and adapted to be engaged by said lever, a valve disc mounted on said stem, a valve seat intermediate said valve operating means and said disc, said seat being removable from said valve on movement of the valve operating means to an inoperative position, an outlet adjacent the bottom of the bowl beneath said lever, a flexible diaphragm in said bowl outlet, said diaphragm having an aperture therein, and means for closing said aperture on depression of said closure means comprising an inverted conical member integral with said lever and having its vertex extending into the aperture in said diaphragm whereby depression of said lever seats said conical member against the walls of the diaphragm defining said aperture.

4. A livestock watering apparatus comprising a source of water, a tank connected to said source, means for heating the water in said tank, means for mixing the heated water from said tank with water from said source, a drinking bowl, a conduit for supplying the mixed water to said bowl and including a valve, bracket-means secured to said tank for supporting said valve, means for securing the bowl to the valve, a valve stem extending through said valve, valve operating means comprising a lever hingedly mounted on the bowl and adapted to engage said stem, a valve disc on said stem, a seat intermediate said disc and said valve operating means, said seat being removable from said valve on movement of the valve operating means to an inoperative position.

5. A livestock watering apparatus comprising a source of water, a tank connected to said source, an electrical resistance element for heating the water in said tank, an enclosure for said tank, a drinking bowl arranged on the outside of said enclosure, a conduit connecting said source with said bowl, a pipe connecting the tank with said conduit and a valve in said pipe adjacent the top of said tank for controlling the proportion of water delivered to said bowl from said tank.

6. A livestock watering apparatus comprising a source of water, a water tank connected to said source, an electrical heating element in heat exchange relationship with said tank, means for mixing heated water from said tank with cold water from said source, a drinking bowl including a valve, a conduit for supplying the mixture of heated and cold water to said valve, a valve stem extending through said valve, valve operating means comprising a lever hingedly mounted on the bowl in operative relationship with said stem, a valve disc on said stem, a valve seat intermediate said disc and said valve operating means, said seat being removable from said valve on movement of the valve operating means to an inoperative position.

7. A livestock watering apparatus comprising a water tank, a valve, bracket means for securing said valve to the tank, a pipe connecting the tank with the valve, a drinking bowl having an outlet in the bottom thereof, means for securing said bowl below the outlet end of said valve, valve operating means comprising a lever hingedly mounted on said bowl and extending downwardly into said bowl with the lower end thereof terminating above the bowl outlet, a valve stem in said valve adapted to be engaged by said valve operating means, a disc on said stem, a seat between the disc and the valve operating means, said seat being removable from said valve on movement of the valve operating means to an inoperative position, and means associated with the lower end of said lever for closing the bowl outlet on movement of said lever to a valve opening position.

LLOYD L. WARTES.

REFERENCES CITED

The following references are of record in the file of this patent:

UNITED STATES PATENTS

| Number | Name | Date |
|---|---|---|
| 1,249,139 | Lewis | Dec. 4, 1917 |
| 1,549,021 | Olson | Aug. 11, 1925 |
| 1,553,739 | Belden | Sept. 15, 1925 |
| 1,590,015 | Gardner | June 22, 1926 |
| 1,646,245 | Hawkins | Oct. 18, 1927 |
| 1,734,583 | Kersten | Nov. 5, 1929 |
| 2,089,725 | Biledeou | Aug. 10, 1937 |